(12) United States Patent
Alexander et al.

(10) Patent No.: US 12,166,508 B2
(45) Date of Patent: Dec. 10, 2024

(54) FIELD REPLACEABLE MULTI-ELEMENT ANTENNA DESIGN FOR SOFTWARE DEFINED RADIO

(71) Applicant: General Dynamics Mission Systems, Inc., Fairfax, VA (US)

(72) Inventors: Steven Alexander, Fairfax, VA (US); Sayuj Haridas, Fairfax, VA (US); Jerry Brooks, Fairfax, VA (US)

(73) Assignee: General Dynamics Mission System, Inc, FairFax, VA (US)

( * ) Notice: Subject to any disclaimer, the term of this patent is extended or adjusted under 35 U.S.C. 154(b) by 121 days.

(21) Appl. No.: 18/049,935

(22) Filed: Oct. 26, 2022

(65) Prior Publication Data
US 2024/0146337 A1 May 2, 2024

(51) Int. Cl.
*H04B 1/00* (2006.01)
*H01Q 1/32* (2006.01)

(52) U.S. Cl.
CPC ......... *H04B 1/0007* (2013.01); *H01Q 1/3275* (2013.01)

(58) Field of Classification Search
CPC ............................ H04B 1/0007; H01Q 1/3275
See application file for complete search history.

(56) References Cited

U.S. PATENT DOCUMENTS

| 8,180,368 B2 * | 5/2012 | Anderson | H04W 64/003 455/449 |
|---|---|---|---|
| 2004/0166909 A1 * | 8/2004 | Lee | H04B 1/0466 455/575.7 |
| 2007/0032250 A1 * | 2/2007 | Feher | H04N 7/20 455/456.2 |
| 2014/0197656 A1 * | 7/2014 | Ochiai | H05K 5/069 296/37.1 |
| 2022/0014348 A1 * | 1/2022 | Papa | H04B 17/345 |
| 2022/0299653 A1 * | 9/2022 | Morales | G01S 5/0221 |

* cited by examiner

*Primary Examiner* — David S Huang
(74) *Attorney, Agent, or Firm* — Lorenz & Kopf, LLP (57) ABSTRACT

A configurable antenna for a software defined radio including a first antenna unit having a first antenna element for receiving a first electromagnetic signal in a first frequency band wherein the first frequency band corresponds to a first mode of operation of a software defined radio, an interface unit having a first connector to couple the first electromagnetic signal from the first antenna unit and a second connector to couple the first electromagnetic signal to the software defined radio, an enclosure configured to receive the interface unit within an internal cavity, and a retention bracket configured to mechanically retain the interface unit within the enclosure, the retention bracket having at least one hole for allowing the first connector to conductively contact the antenna unit.

17 Claims, 4 Drawing Sheets

FIELD REPLACEABLE MULTI-ELEMENT ANTENNA DESIGN FOR SOFTWARE DEFINED RADIO

TECHNICAL FIELD

The technical field relates generally to electromagnetic antenna systems, and more particularly relates to methods and apparatus for providing a field replaceable multi-element antenna design for multi-frequency software defined radio applications having a field replaceable antenna unit and/or a field replaceable signal processing unit incorporated in response to an operating mode of the software defined radio.

BACKGROUND

Software defined radios (SDR) are radio communication systems where much of the signal processing of the received and transmitted radio frequency (RF) signals is performed in the digital domain by digital signal processors performing signal processing algorithms. Performing as much of the signal processing digitally as possible allows some of the SDR capabilities to be selected or changed via user input or software updates to the signal processing algorithms. In addition, SDRs allow hardware providers to extend the life of existing legacy hardware by adopting the parameters of the SDRs to benefit from new system updates, changes in data networks and data network providers, protocol changes for different geographical locations and national communications standards and the like.

While the advent of SDRs has made great improvements in providing flexibility to firmware and software updates, they are fixed in the frequency domain due to the inherent limitation of the hardware front end design including the antenna, amplifier and filtering stages. Should a current SDR user want to adapt to a different frequency of operation, if possible at all, the unit would need to shipped back to the manufacturer to replace the front end design. This greatly prohibits the user to adapt to new use cases requiring frequencies outside the initial hardware design. As such, it is desirable to address these problems and provide a robust solution for providing a field replaceable multi-element antenna design for multi-frequency software defined radio applications. In addition, other desirable features and characteristics will become apparent from the subsequent summary and detailed description, and the appended claims, taken in conjunction with the accompanying drawings and this background.

SUMMARY

Disclosed herein are communications systems, communication algorithms, sensors, transmitter and receiver arrays and related control logic for provisioning software defined radio communications systems, methods for making and methods for operating such systems, and other systems equipped with such transmitters, receivers, and transceivers in an SDR configuration. By way of example, and not limitation, there is presented method and apparatus for providing a dynamically field adapting a SDR architecture to transmit or receive in different frequency bands. In particular, the SDR architecture includes a field replaceable multi-antenna solution including replaceable antenna units and radio frequency processing hardware to facilitate front end hardware updates for different frequency band and/or modulation formats to quickly adapt to new operator requirements.

In accordance with an aspect of the present disclosure, a configurable antenna for a software defined radio including a first antenna unit having a first antenna element for receiving a first electromagnetic signal in a first frequency band wherein the first frequency band corresponds to a first mode of operation of a software defined radio, an interface unit having a first connector to couple the first electromagnetic signal from the first antenna unit and a second connector to couple the first electromagnetic signal to the software defined radio, an enclosure configured to receive the interface unit within an internal cavity, and a retention bracket configured to mechanically retain the interface unit within the enclosure, the retention bracket having at least one hole for allowing the first connector to conductively contact the antenna unit.

In accordance with another aspect of the present disclosure, a method for operating an antenna module including determining a first operating mode of the software defined radio, configuring a first antenna unit for processing an electromagnetic signal to generate a processed signal in response to the first operating mode of the software defined radio, configuring the antenna unit with a first antenna element configured to receive the electromagnetic signal within a first frequency band corresponding to the first mode of operation of the software defined radio, configuring an interface unit for processing the processed signal to generate a digital signal, wherein the interface unit includes a first connector electrically coupled to the antenna unit and a second connector electrically coupled to the software defined radio, and coupling the digital signal to the software defined radio.

In accordance with another aspect of the present disclosure, a communications system including a software defined radio having a first mode of operation and a second mode of operation, an antenna module configured to receive a first antenna unit for receiving a first electromagnetic signal in response to the first mode of operation and a second antenna unit for receiving a second electromagnetic signal in response to the second mode of operation and for coupling one of the first electromagnetic signal and the second electromagnetic signal to the interface unit, and an interface unit configured to generate a digital signal in response to one of the first electromagnetic signal and the second electromagnetic signal, and to couple the digital signal to the software defined radio.

Other objects, advantages and novel features of the exemplary embodiments will become more apparent from the following detailed description of exemplary embodiments and the accompanying drawings.

BRIEF DESCRIPTION OF DRAWINGS

The above-mentioned and other features and advantages of this invention, and the manner of attaining them, will become more apparent and the system and method will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the invention or the application and uses of the invention. Furthermore, there is no intention to be bound by any theory presented in the preceding background or the following detailed description. Various non-limiting embodiments of communications systems, communication system algorithms, and software are provided. In general, the disclosure herein describes a communications system employing SDR systems with field configurable antenna and radio frequency processing circuitry. The exemplary system enables a system operator to replace antenna elements and radio frequency signal processing hardware within a common hardware configuration for receiving and transmitting signals from a SDR within diverse frequency bands.

Figure 1:
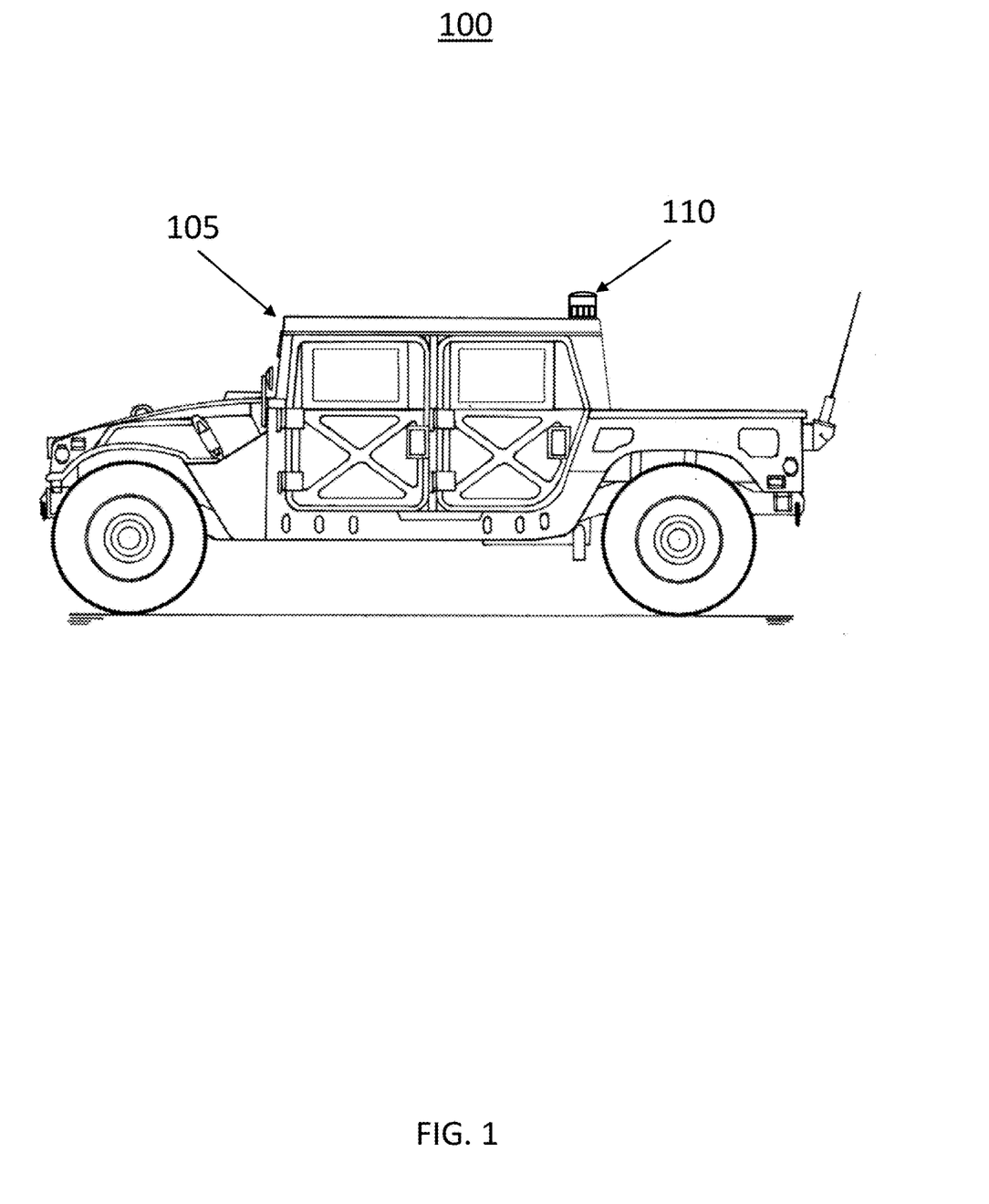
FIG. 1 illustrates an environment for implementing a system for field replaceable multi-element antenna design for multi-frequency software defined radio applications according to an exemplary embodiment of the present disclosure.

Turning now to FIG. 1, an environment 100 for employing the field replaceable multi-element antenna design for multi-frequency software defined radio applications according to an exemplary embodiment of the present disclosure is shown. The exemplary environment 100 a vehicle 105 and the field replaceable antenna 110. While the following exemplary embodiments are illustrated in the context of a vehicle, the field replaceable antenna may be employed in any number of applications, such as home based computer hardware, portable electronics, and other electronic communications systems or networks.

SDRs have many civilian and military applications. In civilian applications, a field replaceable antenna 110 and SDR may extend the usable life of electronic hardware, thereby reducing the cost and logistics with supplying new and replacement hardware to customers. For example, passenger vehicles are increasingly equipped with wireless communications packages for wirelessly transmitting and receiving data signals related to satellite based navigation systems, cellular communications systems, wireless networking, vehicle to vehicle communications and the like. Subscriptions to these wireless communications packages are often administered by the automobile manufactures. In turn, the automobile manufactures lease bandwidth from various service providers. However, once the vehicles leave the manufacturing facility, the vehicle communications hardware is configured to operate with the networks of the service providers. The average service life of an automobile often greatly exceeds the effective life cycle of various communications systems, making the vehicle communications systems obsolete before the end of the vehicle life cycle. Retrofitting these vehicles to work with the newest communications systems is often expensive or impossible. This denies the vehicle owners potential desirable features and denies the automotive manufacturers potential subscription income as the communications systems become obsolete during the life cycle of the vehicle.

In military applications, electronic warfare actions seek to disrupt the electromagnetic spectrum by an adversary. Denial of service of an electromagnetic system may involve jamming a frequency band, thereby disrupting or denying communications within that band. For example, an adversary may transmit strong electromagnetic energy within the frequency band typically used by GPS transmission, rendering GPS receivers incapable of decoding GPS data. Alternatively, adversaries may transmit alternative GPS signals including erroneous data thereby rendering a GPS incapable of determining an accurate location. It is desirable for system operators to be able to change operating frequency bands, modulations formats, antenna configurations and the like to immediately address these electronic warfare actions and regain communications system functionality.

The proposed field replaceable antenna 110 allows a system operator to replace antenna elements to optimize the gain and directivity for particular applications. In addition, the replaceable antenna 110 can allow the user to replace certain radio frequency and/or microwave frequency elements to further optimize the antenna signal processing characteristics to be used with the SDR. For example, the field replaceable antenna 110 can be configured to receive data from GPS satellites with a first set of field replaceable antenna 110 components at 1.2276 GHz and 1.57542 GHz. Alternatively, the SDR can be configured to receive location data from low earth orbit (LEO) satellites at 1.525 MHz. In some exemplary embodiments, the LEO satellite signals may be up to 30 dB stronger than GPS or other GNSS satellite signals. The flexibility of the field replaceable antenna 110 allows the SDR to receive data from systems that may be outside of the frequency band of nearby jammers or other electronic countermeasures.

Figure 2:
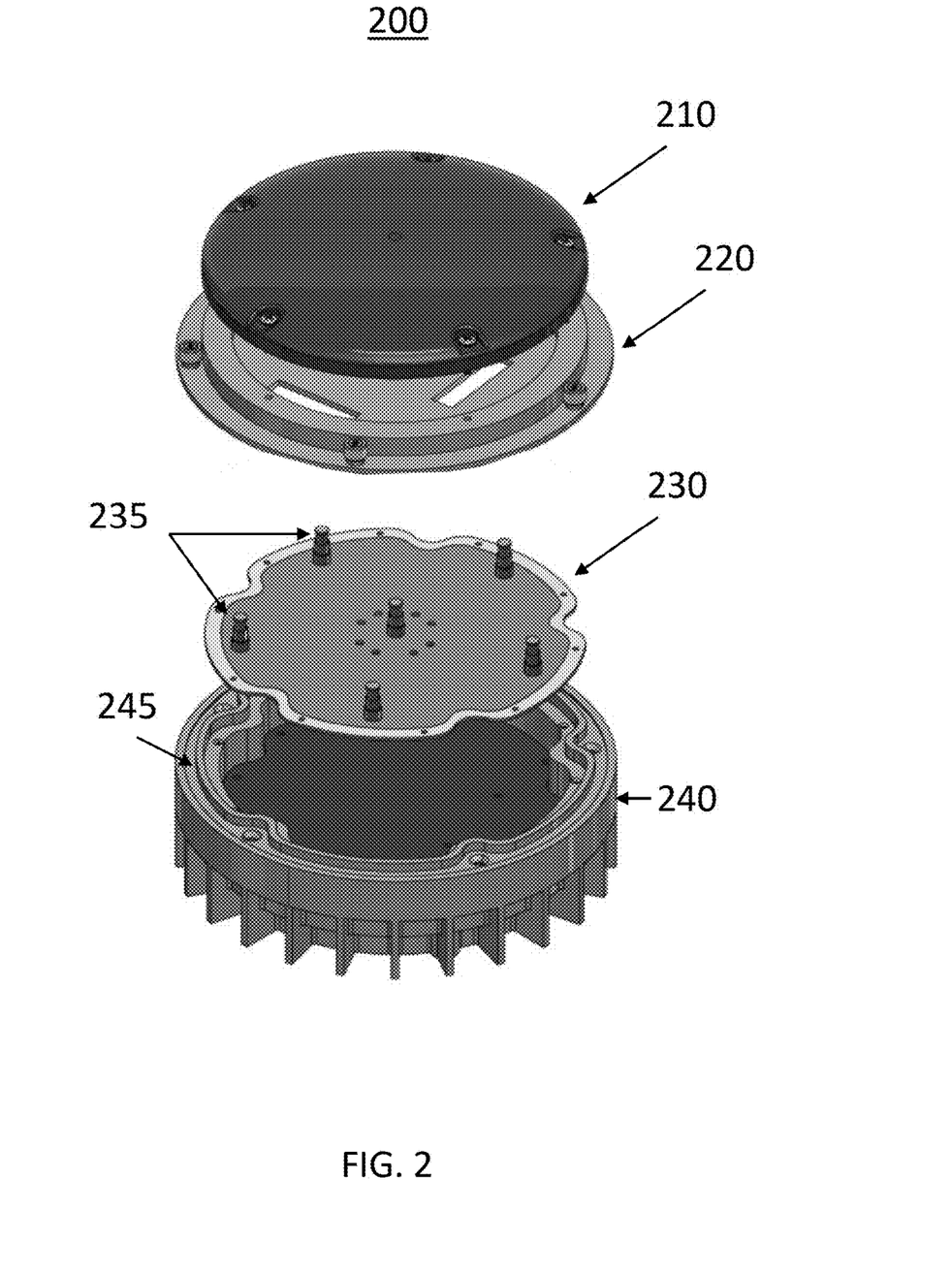
FIG. 2 illustrates a field replaceable multi-element antenna module for multi-frequency software defined radio applications according to an exemplary embodiment.

Turning now to FIG. 2, a field replaceable multi-element antenna module 200 for multi-frequency software defined radio applications according to an exemplary embodiment is shown. The exemplary antenna module 200 includes an antenna unit 210, a retention bracket 220, an interface unit 230, and a circuit enclosure 240.

The circuit enclosure 240 is a waterproof enclosure for mounting and enclosing the interface unit 230. The circuit enclosure 240 may be fabricated from a nonconductive material such as plastic. Alternatively, the circuit enclosure 240 may be fabricated from a conductive material, such as aluminum. The conductive circuit enclosure 240 may be further configured to provide electromagnetic shielding to the interface unit 230 to prevent interference to the interface unit 230 from outside electromagnetic signals, as well as preventing unintentional electromagnetic radiation from being radiated from the interface unit 230 to the outside environment. The circuit enclosure 240 may be further configured to act as a mounting structure for affixing the antenna module 200 to a vehicle mounting bracket or the like. The circuit enclosure 240 may include one or more threaded holes, such as bolt holes or fixing holes for receiving a bolt.

The circuit enclosure 240 further includes a plurality of threaded holes on a union surface 245 for receiving bolts to affix the retention bracket 220 and/or the antenna unit 210 to the circuit enclosure 240. The union surface 245 may further be configured with a recessed channel to receive a flexible gasket (not shown) for providing a weather resistant interface between the circuit enclosure 240 and the retention bracket 220. An interior volume of the circuit enclosure may be uniquely shaped to receive the interface unit 230 having a corresponding shape. In some exemplary embodiments, this unique shape may ensure that the interface unit 230 can only be inserted into the circuit enclosure 240 in a desired orientation. In some exemplary embodiments, the interface unit 230 may include a plurality of notches cut from the circuit board of the interface unit 230 in varying sizes where each of the notches aligns with a correspondingly sized extrusion on the interior of the circuit enclosure 240. This series of notches and extrusions ensures that the interface unit 230 is inserted in the desired orientation and that the interface unit 230 cannot rotate within the circuit enclosure 240, thereby retaining the desired orientation.

In some exemplary embodiments, the interface unit 240 can include signal processing components, such as analog to digital converters and digital signal processors. The interface unit 230 may be configured for transmitting and/or receiving data from the SDR and the antenna unit 210. The interface unit 230 is communicatively coupled to the antenna unit 210 to receive analog signals from the antenna unit 210. The interface unit 230 may then be configured with circuitry to process and digitize the analog signal from the antenna unit 210 to generate a digital signal for coupling to the SDR. In some exemplary embodiments, the interface module 230 may include an analog to digital converter for digitizing the analog signal received from the antenna unit 210 to generate a digital signal. This digital signal may be further processed by a digital signal processor before the resulting digital data is coupled to the SDR.

In some exemplary embodiments, the interface unit 230 may be a field replaceable circuit board used as an interface between the antenna unit 210 and the SDR. The interface unit 230 may include a plurality of sacrificial conductive members 235, electrical couplers or electrical connectors which may erode or be damaged during operation use. This field replaceable interface unit 230 may then be replaced to return the antenna module 200 to its original operational configuration. The interface unit 230 can include a plurality of conductive members 235 for communicatively conducting electromagnetic signals from the antenna unit 210 to the interface unit 230 and circuitry and components integral to the interface unit 230. In some exemplary embodiments, the conductive members 235 may be metallic spring connectors rigidly coupled to the interface unit 230 and configured such that when the antenna unit 210 is affixed to the circuit enclosure 240, a positive pressure results between the metallic spring connector and a bottom surface of the antenna unit 210. This positive pressure allows for a more reliable electrically conductive connection between the conductive members 235 and the antenna unit 210.

The retention bracket 220 is configured to retain the interface unit 230 within the circuit enclosure 240. The retention bracket 220 can be fabricated from conductive or nonconductive material depending on design requirements. The retention bracket 220 may include a plurality of holes along an outer edge aligned with the threaded holes in the union surface 245 of the circuit enclosure 240. These holes may allow the retention bracket 220 to be affixed to the circuit enclosure 240, thereby retaining the interface unit 230 within the circuit enclosure 240. In addition, the retention bracket 220 can include a plurality of holes to accommodate the conductive members 235 passing through the holes of the retention bracket 220 in order to form the electrically conductive connection between the interface unit 230 and the antenna unit 210.

The antenna unit 210 may include a plurality of antenna elements selected to optimally receive and/or transmit signals of interest for the desired SDR radio configuration. The antenna unit 210 may include one or more surfaces on the bottom of the antenna unit 210 for coupling received signals from the antenna elements to the interface unit 230 via the conductive members 235. Electromagnetic signals may be coupled between the antenna unit 210 and the interface unit 230 via conductive members 235. In some exemplary embodiments, these conductive members 235 may be spring loaded telescopic pins configured for maintaining a positive pressure electrical connection between the antenna unit 210 and the RF module 230. In some exemplary embodiments, the antenna unit 210 may include radio frequency components for amplifying, filter and down convert the signals from the antenna unit 210 to generate an intermediate frequency analog signal for coupling to the interface unit 230. The antenna unit 210 may include radio frequency analog signal processing components, such as RF filters, low noise amplifiers (LNA), frequency down converters, and intermediate frequency amplifiers.

Figure 3:
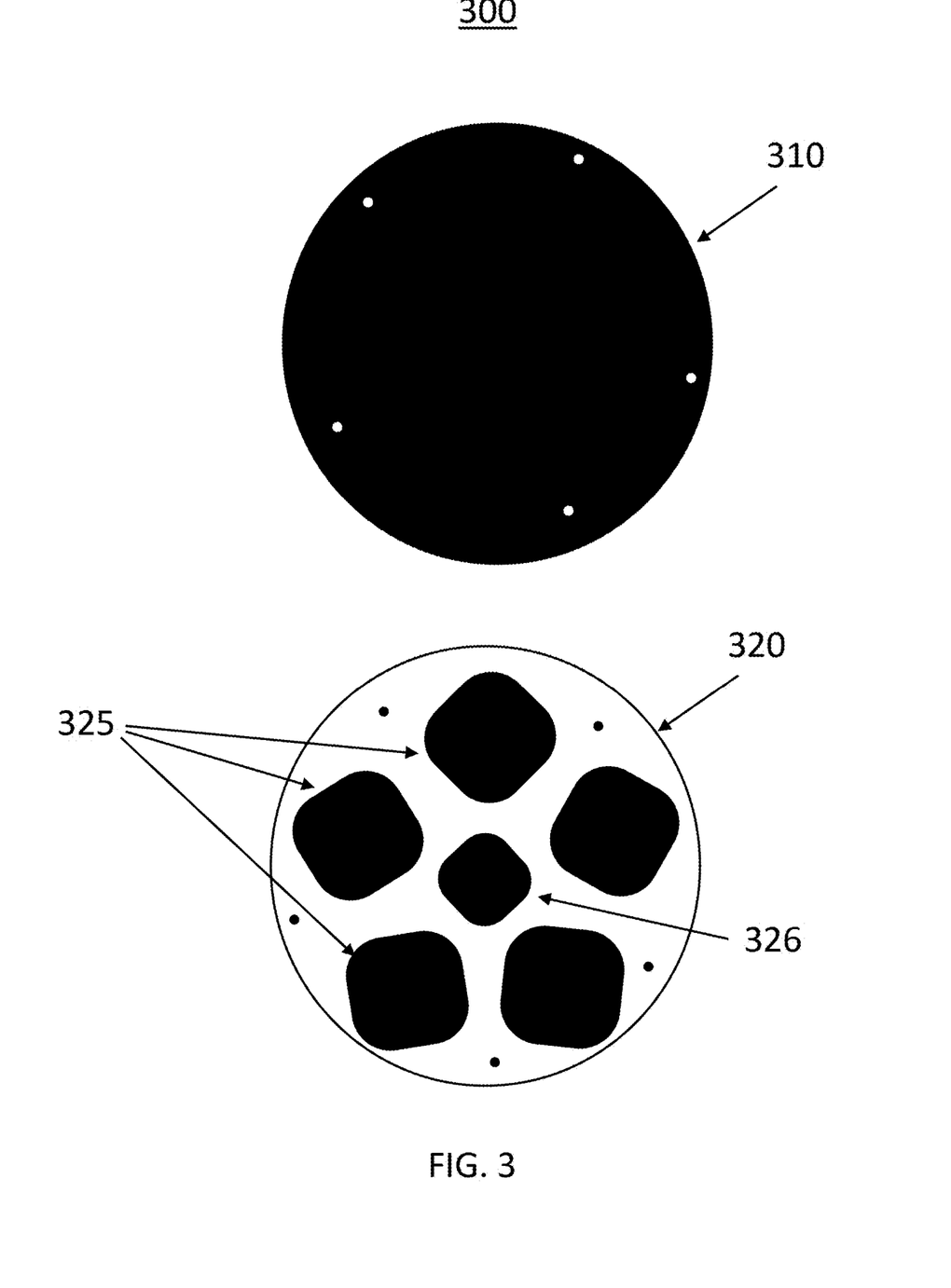
FIG. 3 illustrates an antenna unit for use in a field replaceable multi-element antenna module for multi-frequency software defined radio applications according to an exemplary embodiment.

Turning now to FIG. 3, an antenna unit 300 for use in a field replaceable multi-element antenna module for multi-frequency software defined radio applications according to an exemplary embodiment is shown. The exemplary antenna unit 300 includes a protective cover 310 and an RF circuit board 320. The protective cover 310 can be fabricated from a non-conductive material such that the protective cover 310 is essentially transparent to electromagnetic signals. The protective cover 310 can provide weather protection to the RF circuit board 320 and other circuitry within the field replaceable multi-element antenna module. In some exemplary embodiments, the protective cover 310 may be rigidly affixed to the retention bracket and/or the circuit enclosure using bolts or screws though corresponding holes in the RF circuit board 320. In some exemplary embodiments, the protective cover 310 may affixed directly to the RF circuit board 320 via an adhesive or formed as a conformal coating or the like.

In some exemplary embodiments, the RF circuit board 320 may be a two sided circuit board with antenna elements 325 formed on a first side and electrical contacts formed on the second side. The antenna elements 325 may be conductively connected to the electrical contacts by conductive vias through the circuit board or the like. The antenna elements 325 can be configured to receive electromagnetic signals in particular frequency bands of interest. In some exemplary embodiments, each of the antenna elements 325 may be sized to receive and/or transmit signals of different frequencies. Alternatively, some of the antenna elements 325 may be configured as an antenna array wherein each antenna element of the array receives and/or transmits signals in the same frequency band. An antenna array may facilitate electronic steering of the antenna array directivity, or may allow for determination of a direction of an incoming received electromagnetic signal. In some exemplary embodiments, some of the antenna elements 325 may be sized for a first frequency band for receiving signals within that first frequency band with one or more of the other antenna elements 325 configured for transmitting electromagnetic signals in a second frequency band. In the illustrated exemplary embodiment, a center antenna element 326 is configured for transmitting an electromagnetic signal at a first frequency and the remaining antenna elements 325 are larger and configured for receiving electromagnetic signals at a second frequency where the second frequency has a larger wavelength than the electromagnetic signals at the first frequency.

In some exemplary embodiments, RF circuitry may be formed on the RF circuit board 320 for converting the received RF signals to intermediate frequency signals or the like. This circuitry may include RF filters, low noise amplifiers (LNA), frequency down converters, and intermediate frequency amplifiers. In some exemplary embodiments, the RF circuitry may be formed on the second side of the RF circuit board 320 and coupled to the antenna elements 325 using vias or the like.

Figure 4:
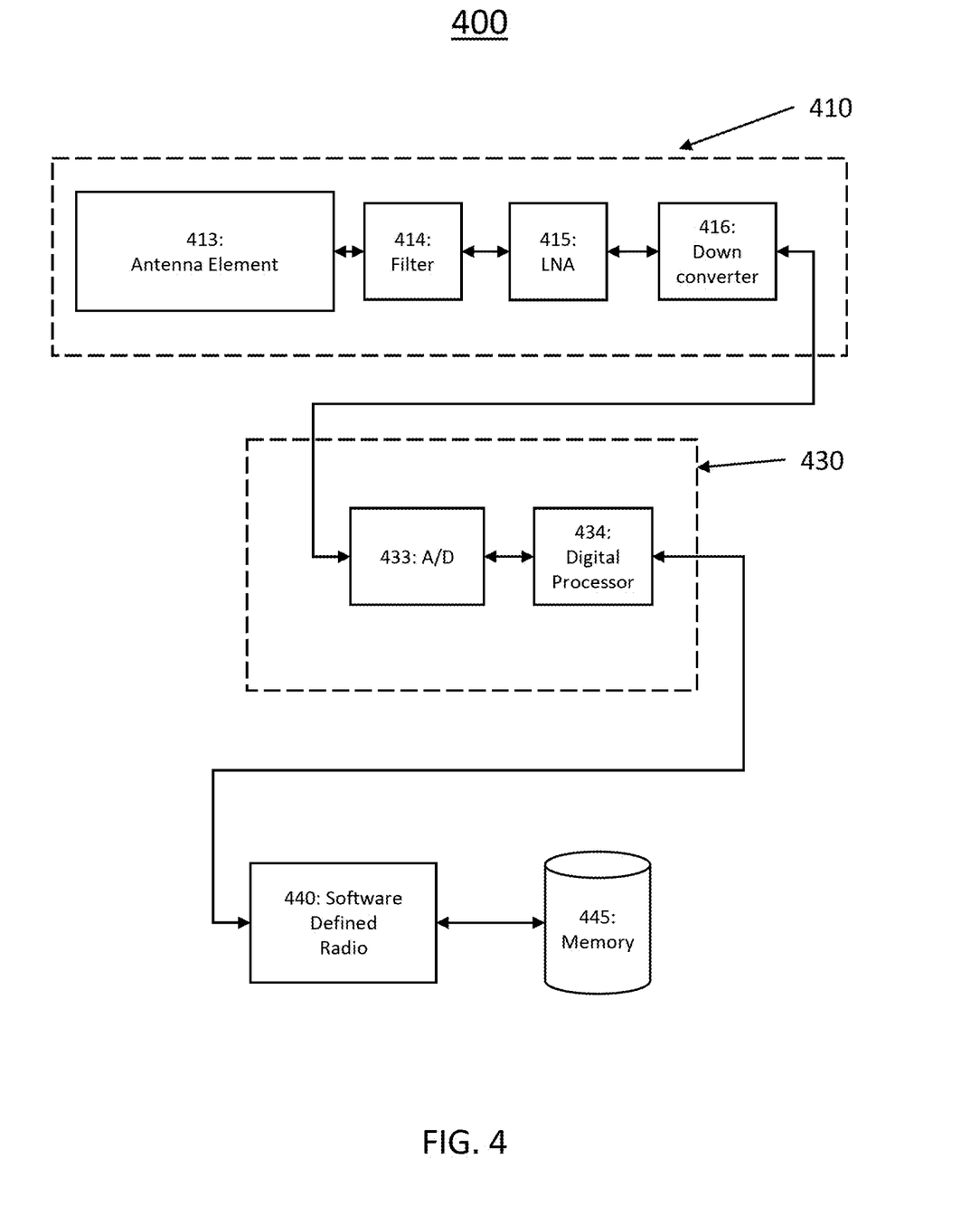
FIG. 4 illustrates a communications system employing a field replaceable multi-element antenna module for multi-frequency software defined radio applications according to an exemplary embodiment.

Turning now to FIG. 4, another non-limiting embodiment of a communications system 400 employing a field replaceable multi-element antenna module for multi-frequency software defined radio applications is shown. The exemplary communications system 400 can include a field replaceable antenna unit 410 including at least one antenna element 413, an interface unit 430, a software defined radio (SDR) 440 and a memory 445.

The field replaceable antenna unit 410 includes at least one antenna element 413 for receiving and/or transmitting a first electromagnetic signal in a first frequency band wherein the first frequency band corresponds to a first mode of operation of a SDR 440. A system user can replace the field replaceable antenna unit 410 with an alternate antenna unit having an alternate antenna element for receiving a second electromagnetic signal in a second frequency band. The second frequency band corresponds to a second mode of operation of the software defined radio. The field replaceable antenna unit 410 can include a nonconductive weatherproof layer. The antenna element 413 may be a single antenna element configured to optimally receive an electromagnetic signal at a single frequency or may be a plurality of antenna elements for receiving electromagnetic signal over a number of frequencies within the first frequency band. The antenna element 413 may be an antenna array having a steerable directivity and/or may include antenna elements for receiving electromagnetic signals at a first frequency and transmitting electromagnetic signals at a second frequency.

In some exemplary embodiments, the field replaceable antenna unit 410 may further include RF circuitry for processing analog signals received, or to be transmitted by, the antenna element 413. For example, the antenna unit 410 may include a filter 414, an LNA 415 and/or a signal frequency downconverter 416. The filter 414 may be configured to attenuate signals received by the antenna element 413 that are outside the first frequency band. The LNA 415 can be configured to amplify signals within the first frequency band and the down converter 416 may be configured to down convert the received signal at a first frequency within the first frequency band to an intermediate frequency signal at a lower frequency.

In some exemplary embodiments, the communications system 400 may be configured to receive satellite-based positioning, navigation and timing (PNT) system signals from various systems, such as GPS and Galileo, LEO based GNSS systems and the like. The field replaceable antenna unit 410 may be replaced by a user in response to the intended source of the PNT signals. This allows for greater flexibility of the SDR 440 when one or more PNT signals sources are unavailable.

The interface unit 430 can configured for coupling an analog signal from the antenna unit 410 to the SDR 440. The interface unit 430 can include electrical connectors positioned to couple the analog signals from antenna unit electrical contacts to the interface unit 430. The interface unit 430 can be further configured to couple this analog signals to the software defined radio 440 via a electrical connector and/or cable. In some exemplary embodiments, interface unit 430 may further include circuitry and electrical components for further processing the analog signals received from the antenna unit 410 in response to either the first mode of operation of the SDR 440 or the second mode of operation of the SDR 440 and for generating a processed signal to couple to the SDR 440. In some exemplary embodiments, the signal processing board 430 can include an analog to digital converter 433 and/or a digital processor 434. The digital processor 434 can be operative to convert the digitized signal received from the A/D 433 from a first data format to a second data format.

In some exemplary embodiments, the SDR 440 may generate a control signal to couple to the interface unit 430 in order to configure the digital processor 434 and/or the A/D 433 in response to the operating mode of the SDR 440. The control signal may be generated by the SDR 440 in response to data stored in a memory 445 corresponding the field replaceable antenna unit 410 and the interface unit 430. In some exemplary embodiments, the interface unit 430 may be field replaceable by a user in response to a operating mode of the SDR 440. Enabling the user to replace one or more of the field replaceable antenna unit 410 and the interface unit 430 greatly increases the functionality and operating frequency range of the SDR 440.

To accommodate the user replaceable functionality of the field replaceable antenna unit 410 and the interface unit 430, the interface unit 430 may include a plurality of spring loaded connectors for electrically and communicatively coupling the interface unit 430 to the field replaceable antenna unit 410 and a connector or interface communicatively coupled to the SDR 440. In some exemplary embodiments, these spring loaded connectors may include telescopic pin connectors configured to exert a positive force between the field replaceable antenna unit 410 and the interface unit 430 when the field replaceable antenna unit 410 and the interface unit 430 have been affixed to an antenna enclosure or the like. In some exemplary embodiments, these spring loaded connectors may include a plurality of beryllium copper spring fingers or the like.

The antenna enclosure of the communications system 400 may include an internal cavity to receive the interface unit 430 and a retention bracket configured to mechanically retain the interface unit 430 within the enclosure. In some exemplary embodiments, the antenna enclosure may have one open side such as a five sided cube wherein the open side is configured to receive the interface unit 430. The retention bracket may then be affixed over the open side of the enclosure, thereby enclosing the internal cavity and restraining the interface unit 430 within the internal cavity. In some exemplary embodiments, the retention bracket may include threaded holes or the like for receiving threaded bolts or screws for attaching the antenna unit 410 to the exterior of the retention bracket. The retention bracket may further include a plurality of holes allowing the spring loaded connectors to pass through the retention bracket and form the communicative coupling between the interface unit 430 and the antenna unit 410.

The communications system 400 may be configured for a user designated software defined operating mode by determining a first operating mode of the software defined radio and configuring an antenna unit with a signal processing board for processing an electromagnetic signal to generate a processed signal in response to the first operating mode of the software defined radio. The antenna unit 410 can be configured with a first antenna element configured to receive the electromagnetic signal within a first frequency band corresponding to the first mode of operation of the software defined radio. The processed signal may then be coupled to the SDR 440 for data extraction and the like.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those of ordinary skill in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

As used herein, the term processor refers to any hardware, software embodied in a medium, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that perform the described algorithms.

It is further noted that the systems and methods may be implemented on various types of data processor environments (e.g., on one or more data processors) which execute instructions (e.g., software instructions) to perform operations disclosed herein. Non-limiting examples include implementation on a single general-purpose computer or workstation, or on a networked system, or in a client-server configuration, or in an application service provider configuration. For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. For example, a computer can be programmed with instructions to perform the various steps of the flowcharts described herein. The software components and/or functionality may be located on a single computer or distributed across multiple computers.

What is claimed is:

1. A configurable antenna for a software defined radio comprising:
    a first antenna unit having a first antenna element for receiving a first electromagnetic signal in a first frequency band wherein the first frequency band corresponds to a first mode of operation of a software defined radio;
    an interface unit having a first connector to couple the first electromagnetic signal from the first antenna unit and a second connector to couple the first electromagnetic signal to the software defined radio;
    an enclosure configured to receive the interface unit within an internal cavity and to receive an alternate interface unit to replace the interface unit in response to a second mode of operation of the software definable radio; and
    a retention bracket configured to mechanically retain the interface unit within the enclosure, the retention bracket having at least one hole for allowing the first connector to conductively contact the antenna unit.

2. The configurable antenna of claim 1 wherein the first antenna unit further includes a signal processing circuitry for processing the first electromagnetic signal in response to the first mode of operation of the software defined radio and for generating a processed signal to couple to the software defined radio via the interface unit.

3. The configurable antenna of claim 1 further configured to receive a second antenna unit for receiving a second electromagnetic signal in a second frequency band, wherein the second frequency band corresponds to a second mode of operation of the software defined radio and for processing the second electromagnetic signal in response to the second mode of operation of the software defined radio to generate the processed signal to couple to the software defined radio via the interface unit.

4. The configurable antenna of claim 3 wherein the first antenna unit can be replaced by the second antenna unit without removing the interface unit from the configurable antenna.

5. The configurable antenna of claim 3 wherein the first antenna unit is configured for receiving the electromagnetic signal from a global positioning system satellite.

6. The configurable antenna of claim 1 wherein the first antenna element is an antenna array configured for receiving the electromagnetic signal from a low earth orbit satellite.

7. The configurable antenna of claim 1 wherein the first antenna unit includes a low noise amplifier and a bandpass filter corresponding to the first frequency band.

8. The configurable antenna of claim 1 wherein the interface includes an analog to digital converter for converting the electromagnetic signal received from the first antenna unit to a digital signal.

9. The configurable antenna of claim 1 wherein the interface unit includes a digital signal processor for processing the electromagnetic signal in response to the first mode of operation of the software defined radio and a second mode of operation of the software defined radio.

10. The configurable antenna of claim 1 wherein the first antenna unit can be replaced by a second antenna unit by a user.

11. A method for operating an antenna module comprising:
    determining a first operating mode of the software defined radio;
    configuring a first antenna unit for processing an electromagnetic signal to generate a processed signal in response to the first operating mode of the software defined radio;
    configuring the first antenna unit with a first antenna element configured to receive the electromagnetic signal within a first frequency band corresponding to the first mode of operation of the software defined radio;
    configuring an interface unit for processing the processed signal to generate a digital signal, wherein the interface unit includes a first connector electrically coupled to the first antenna unit and a second connector electrically coupled to the software defined radio wherein the antenna module further includes an enclosure for enclosing the interface unit, a retention bracket configured for retaining the interface unit within the enclosure and further configured to receive the first antenna unit on an exterior surface of the retention bracket; and
    coupling the digital signal to the software defined radio.

12. The method of claim 11 further comprising:
    determining a second operating mode of the software defined radio;

configuring the antenna module with a second antenna unit configured to receive the electromagnetic signal within a second frequency band corresponding to the second mode of operation of the software defined radio.

13. The method of claim 11 wherein the interface unit and the first antenna unit are communicatively coupled by a plurality of spring loaded conductors.

14. The method of claim 11 wherein the interface unit includes an analog to digital converter and wherein the processed signal is an analog signal.

15. The method of claim 11 wherein the interface unit includes a digital signal processor and wherein the processed signal is processed in response to a control signal indicative of the first mode of operation of the software defined radio.

16. The method of claim 11 wherein the first antenna unit includes a low noise amplifier for amplifying signals within the first frequency band and an analog filter for attenuating signals outside of the first frequency band.

17. A communications system comprising:
 a software defined radio having a first mode of operation and a second mode of operation;
 an antenna module configured to receive a first antenna unit for receiving a first electromagnetic signal in response to the first mode of operation and a second antenna unit for receiving a second electromagnetic signal in response to the second mode of operation and for coupling one of the first electromagnetic signal and the second electromagnetic signal to the interface unit; and
 an interface unit configured to generate a digital signal in response to one of the first electromagnetic signal and the second electromagnetic signal, and to couple the digital signal to the software defined radio; and
 an enclosure for enclosing the interface unit, a retention bracket configured for retaining the interface unit within the enclosure and further configured to receive the antenna module on an exterior surface of the retention bracket and wherein the retention bracket includes at least one hole for allowing an conductive connector to communicatively couple the first electromagnetic signal and the second electromagnetic signal between the antenna module and the interface unit.

\* \* \* \* \*